July 28, 1925.
D. L. KOHLMAN, JR
1,547,763
STEAMING OR COOKING VESSEL
Original Filed Dec. 4, 1923
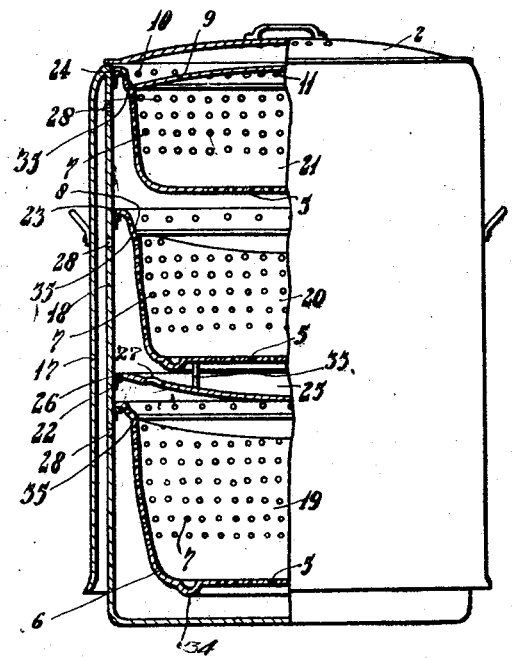
Inventor:
Dirk Lodewijk Kohlman, Jr
By
Attorney Patented July 28, 1925.

1,547,763

UNITED STATES PATENT OFFICE.

DIRK LODEWIJK KOHLMAN, JR., OF DORDRECHT, NETHERLANDS.

STEAMING OR COOKING VESSEL.

Original application filed December 4, 1923, Serial No. 678,463. Divided and this application filed November 24, 1924. Serial No. 751,983.

*To all whom it may concern:*

Be it known that I, DIRK LODEWIJK KOHLMAN, Jr., a subject of the Queen of the Netherlands, residing at Dordrecht, the Netherlands, have invented certain new and useful Improvements in Steaming or Cooking Vessels, of which the following is a specification.

This invention relates to a steaming or cooking pan, kettle or other vessel of the type having an inner and an outer pan communicating with each other by means of perforations in the inner pan. The invention has for its general object to provide an improved device of the kind indicated, in particular with regard to bringing and keeping the contents of the inner pan at the desired uniform temperature, in which an inner pan is used with combined pans of the above type, and in which the outer pan is provided with an improved bottom construction. No claim is, however, made to any of the features enumerated above per se, since they comprise the subject-matter of my co-pending application Serial No. 678,463, filed December 4, 1923, of which this application is a division. The main object of the present application is to provide a cooking or steaming pan comprising an outer pan and a plurality of inner pans located one above the other and in which the above features may be combined.

In order that the invention may be clearly understood reference is directed to the accompanying drawing in which an embodiment of the invention is illustrated.

The figure of the drawing shows partly in section and partly in elevation an outer pan containing three inner pans located one above the other.

The outer pan 18 is provided with a mantle 17 and in this outer pan are mounted three inner pans 19, 20 and 21. Each of the inner pans may comprise a flange portion 35 below the upper edge to form a support for the cover and the portion of the pan above the flange may be perforated. The outer pan 18 is further provided with supporting annular flanges 22, 23 and 24 secured to its inner wall, from which flanges the inner pans are suspended with their upper edges being suitably shaped to this end. Instead of supporting flanges for the upper edge of the inner pans a supporting plate 25 may be used resting on a supporting flange 26, and on the supporting plate an inner pan having feet 33 may be placed. The supporting plate possesses one or more apertures 27 for the passage of steam. The perforated covers of the lower and middle pan are reversed and are adapted to receive eventual condensation water. The mantle 17 extends from the upper edge of the outer pan 18 downwardly to almost the lower end of this pan so that a heating space surrounds the whole pan. The wall of the outer pan 18 is provided with openings 28 for heat transmission and upon the top a cover 2 is placed. The inner pans are provided with perforations 7 for the purpose of allowing the passage of steam and it will be noted that the inner pan 21 may comprise a cover 9 having perforations 11 therein and above said cover perforations 10 may be provided in the side of the pan. Each pan is provided with a perforated bottom portion 5.

The operation of this steaming or cooking pan is as follows: Assuming that the inner pans are filled with any articles to be cooked and that the outer pan contains water, the level of which is located just below the bottom of the pan 19, then, the steam generated after the pan has been heated for some time ascends and enters the perforations in the bottom of the pan 19 and so on through each of the pans 20 and 21. Some of the steam will of course ascend between the side walls of the inner pans and the outer pan and this will enter the perforations 7 in the sides of the inner pans. In the meantime the hot gases resulting from the gas flame will ascend along the sides of the outer pan and the mantle 17 and will enter through the perforations 28 into the space between the outer pan and the inner pan. An excess of hot gases can escape through the perforations in the cover 2 by means of perforations 10. In this way condensation of steam between the inner and outer pan is prevented while the heat generated is most advantageously and completely utilized. The annular projection 34 in the inner pan 19 is for the purpose of directing the steam into the perforations and thus into the pan. In order to prevent the central part of the contents of the inner pan from becoming too hot, the central portion of the bottom of the inner pan may be unperforated so that the bottom of the inner pan only has perforations between an unperforated central portion and an unperforated circumferential portion.

If desired the outer pan may have vertical passages into which the flames of the heat source can enter so that in this way the best source is utilized most effectively. The said passages may be narrower at the top and grow wider gradually downwardly. The outer pan may be rectangular in cross section and a passage may then be provided at each corner.

I claim as my invention:

1. A steaming or cooking vessel comprising an outer pan; a supporting plate in said pan, a plurality of perforated inner pans supported in said outer pan and on said plate; and a cover for each of the inner pans adapted to seat below the upper edge of that inner pan to thus form a perforated wall portion above the cover.

2. A steaming or cooking vessel comprising an outer pan; a supporting plate in said pan, a plurality of perforated inner pans supported in said outer pan and on said plate, each of said pans having an annular flange below the upper edge thereof; and a cover adapted to seat on each of said annular flanges thus forming a perforated wall portion above the cover.

3. A steaming or cooking vessel comprising an outer pan; a supporting plate in said pan; a plurality of inner pans supported in said outer pan and on said supporting plate; and a cover for said outer pan.

4. A steaming or cooking vessel comprising an outer pan; a supporting plate in said pan; a plurality of inner pans supported in said outer pan and on said supporting plate; a cover for said outer pan and a mantle surrounding said outer pan for directing and retaining the heat.

5. A steaming or cooking vessel comprising an outer pan; a plurality of annular flanges secured to the inner side wall of said outer pan; an inner pan supported on each of said flanges; and a cover for said outer pan.

6. A steaming or cooking vessel comprising an outer pan; a plurality of annular flanges secured to the inner side wall of said outer pan; an inner pan supported on each of said flanges; a cover for said outer pan; and a mantle surrounding said outer pan for directing and retaining the heat.

7. A steaming or cooking vessel comprising an outer pan; a plurality of annular flanges secured to the inner side wall of said outer pan; an inner pan supported on each of said flanges; a cover for said outer pan; a mantle surrounding said outer pan for directing and retaining the heat; and a cover for each of said inner pans.

8. A steaming or cooking vessel comprising an outer pan; a plurality of annular flanges secured to the inner side wall of said outer pan; a plurality of inner pans supported in said outer pan on said flanges, each of said inner pans having perforations therein; a cover for each of the inner pans adapted to seat below the upper edge of that inner pan to thus form a wall portion above the cover; and a mantle surrounding the side of the outer pan for directing and retaining the heat.

9. A steaming or cooking-vessel comprising an outer pan; a supporting plate in said pan; a plurality of perforated inner pans supported in said outer pan and on said plate; a cover for each of the inner pans adapted to seat below the upper edge of that inner pan to thus form a perforated wall portion above the cover; a cover for said outer pan; and a mantle surrounding the side of the outer pan for directing and retaining the heat.

10. A steaming or cooking vessel comprising an outer pan having perforations in the side wall; a supporting plate in said pan; a plurality of perforated inner pans supported in said outer pan, one of said inner pans being supported on said plate; a cover for each of the inner pans adapted to seat below the upper edge of said inner pan to thus form a perforated wall portion above the cover; and a mantle surrounding the side of the outer pan and secured thereto at the upper edge for retaining and directing the heat.

11. A steaming or cooking vessel comprising an outer pan; a plurality of annular flanges secured to the inner wall of said outer pan; a plurality of perforated inner pans supported in said outer pan on said flange, each of said inner pans having a bottom portion comprising an imperforated annular portion surrounding a perforated central portion; a cover for each of said inner pans; and a cover for said outer pan.

12. A steaming or cooking vessel comprising an outer pan having perforations in the side wall; a plurality of annular flanges secured to the inner wall of said outer pan; an inner pan supported on each of said flanges, each of said pans having perforations in the side wall and in the bottom portion; a cover for each of the inner pans adapted to seat below the upper edge of the side wall to thus form a perforated wall portion above the cover; a cover for said outer pan; and a mantle surrounding said outer pan secured at the upper edge thereof and adapted to direct and retain the heat.

13. A steaming or cooking vessel comprising an outer pan; a plurality of annular flanges secured to the inner wall of said outer pan; a plurality of perforated inner pans supported in said outer pan on said flanges, each of said inner pans having a bottom portion comprising an imperforated annular portion surrounding a perforated central portion; a cover for each of said inner pans; a cover for said outer pan; and a mantle surrounding the outer pan for directing and retaining the heat.

14. A steaming or cooking vessel comprising an outer pan having perforations in the side wall; a plurality of annular flanges secured to the inner wall of said outer pan; an inner pan supported on each of said flanges, each of said pans having perforations in the side wall and in the bottom portion; a cover for each of the inner pans adapted to seat below the upper edge of the side wall to thus form a perforated wall portion above the cover; a cover for said outer pan; a mantle surrounding said outer pan secured at the upper edge thereof and adapted to direct and retain the heat; and an annular projection on the bottom portion of said pans for directing the steam to the perforations in the bottom of the inner pan.

In witness whereof I have hereunto set my hand this 31st day of October, 1924.

DIRK LODEWIJK KOHLMAN, Jr.